United States Patent Office 3,544,263
Patented Dec. 1, 1970

3,544,263
METHOD OF REMOVING SULFUR DIOXIDE FROM GASES
Nobutaka Ninomiya and Hirohiko Ichikawa, Kyoto, and Hiroshi Nishino, Nishinomiya, Japan, assignors to Takeda Chemical Industries, Ltd., Higashi-ku, Osaka, Japan
No Drawing. Filed Jan. 12, 1968, Ser. No. 697,321
Claims priority, application Japan, Jan. 13, 1967, 42/2,580
Int. Cl. B01d 53/34
U.S. Cl. 23—2                                              9 Claims

ABSTRACT OF THE DISCLOSURE

Sulfur dioxide is removed from $SO_2$-containing gas by passing the latter through a carbonized intimate mixture of bituminous coal and inorganic sodium compound or potassium compound (about 5 to about 75 mg. equivalent of K or Na atom per 100 grams of the coal), the said mixture having first been subjected to gasification at elevated temperature up to a gasification yield of from about 20 to about 40 weight percent.

---

This invention relates to a method for removing sulfur dioxide from a gas containing the same, and, more particularly, to a method for removing sulfur dioxide from gas containing the same, with the aid of carbon produced by gasification of a carbonized intimate admixture of bituminous coal and an inorganic potassium compound or sodium compound.

It is hitherto known that sulfur dioxide can be removed from gas containing the same, with the aid of metallic oxide (e.g. platinum oxide, vanadium oxide, etc.), coke or conventional activated carbon.

However, these prior methods are bound up with defects. Thus, the methods employing metallic oxide must be carried out at a considerably high temperature, and the sulfur dioxide removing efficiency of the methods using coke or conventional activated carbon is not satisfactory. Thus, these prior methods are not advantageous from an industrial point of view.

The object of this invention is accordingly to provide an industrially feasible method for removing sulfur dioxide from gas containing the same, at high efficiency and even under a relatively low temperature.

This object is realized by contacting the sulfur dioxide-containing gas with carbon produced by gasification of a carbonized intimate admixture of bituminous coal and an inorganic potassium compound or sodium compound.

The carbon of the present invention is produced by the procedure hereinafter described.

As the first step, a mixture of bituminous coal and an inorganic potassium compound or sodium compound is subjected to carbonization to give a carbonized product.

As the bituminous coal, that having an average grain size of about $10\mu$ to about $600\mu$ is advantageously employed. As the inorganic potassium compound or sodium compound, there is employed, for example, sodium oxide, sodium hydroxide, sodium carbonate, sodium bicarbonate, sodium sulfate, sodium nitrate, sodium chloride, sodium bromide, sodium iodide, sodium permanganate, sodium cyanide, sodium bichromate, potassium oxide, potassium hydroxide, potassium carbonate, potassium bicarbonate, potassium sulfate, potassium nitrate, potassium chloride, potassium bromide, potassium iodide, potassium bichromate and the like. Among these compounds, use is most advantageously made of sodium carbonate, sodium sulfate, potassium carbonate, or potassium sulfate. The inorganic compounds may be used either singly or in combination of two or more thereof.

The amount of the inorganic potassium compound or sodium compound to be mixed with the bituminous coal is selected so as to adjust the content of the inorganic compound contained in the carbonized product at about 10 to about 120 mg. equivalent of Na or K atom relative to 100 g. of carbonized bituminous coal (i.e. bituminous coke), and generally, the inorganic potassium compound or sodium compound is admixed with the bituminous coal in an amount of about 5 to about 75 mg. equivalent of Na or K atom relative to 100 g. of the bituminous coal.

When the admixing of the inorganic compound and the coal is effected, conventional binder such as coal tar pitch, coal tar, molasses, pulp-drainage, etc. may be incorporated, if desired. The inorganic potassium compound or sodium compound can be admixed with the bituminous coal either in the solid state or in the form of an aqueous solution.

The mixture of said coal and inorganic potassium compound or sodium compound is then subjected to low temperature carbonizatiton. In the method of this invention, elevation of the temperature of the carbonizatiton is preferably effected gradually. Advantageously the highest temperature of the carbonization is at about 900° C., and optimally at about 450–700° C. Time required for the carbonization is generally from about 4 to about 20 hours. Thus, there is produced the carbonized product which consists of carbonized bituminous coal (i.e. bituminous coke) in intimate admixture with an inorganic potassium compound or sodium compound in an amount of about 10 to about 120 mg. equivalent of Na or K atom relative to 100 g. of the bituminous coke.

As the second step, the carbonized product obtained in the first step is subjected to gasification at a temperature ranging from about 750° C. to about 1100° C., more desirably from about 800 to about 950° C. The gasification is conducted in an atmosphere of, singly or in combination, steam, carbon dioxide, flue gas, sulfur dioxide, air, etc. Particularly, use is advantageously made of steam or steam-containing flue gas. In the present invention, the gasification is continued until the gasification yield reaches about 20 to about 40 weight percent, that is to say, until about 20 to about 40 weight percent of the carbonized product used is gasified.

The above-mentioned gasification yield is the most characteristic feature of the present invention. More concretely stated, all the hitherto known so-called activated carbons are produced by gas-activating a carbonized product until the gasification yield reaches more than about 50 weight percent, but these activated carbons have very low capacity for removing sulfur dioxide, and therefore, the object of the present invention cannot be realized by using these activated carbons. On the other hand, by terminating the gasification of the carbonized product as specified above at about 20 to about 40 weight percent, a porous carbon which is physically and chemically quite different from the known so-called activated carbons, can be produced. Thus-produced porous carbon shows an excellent capacity for removing sulfur dioxide. The object of the present invention can be realized by using the thus-produced porous carbon.

In this specification, thus-produced porous carbon is hereinafter simply termed "carbon."

In the present invention, removal of sulfur dioxide is carried out by contacting sulfur dioxide-containing gas with the carbon produced by the procedure set forth above.

The contact may be variously carried out. For example, the sulfur dioxide-containing gas can be passed through a column packed with the above-mentioned carbon. Even when the contact is carried out at such a low temperature as about 80 to about 100° C., the removal of the sulfur dioxide can effectively be attained. However, if necessary, the contact may be effected at any temperature not higher than about 200° C. to give substantially the same result.

According to the present method, it seems that sulfur dioxide contacted with the carbon of the present invention is oxidized to sulfur trioxide by the catalytic action of the carbon and is subsequently changed to sulfuric acid by moisture contained in the sulfur dioxide-containing gas and the thus-produced sulfuric acid is entrapped by the carbon.

Sulfuric acid thus caught by the carbon can be taken off as sulfur dioxide by heating the carbon, or as sulfuric acid by washing the carbon with water. By these treatments the carbon is regenerated and therefore after these treatments the carbon can be used again in the present method.

TEST 1

Change of $SO_2$-removing capacity of carbon according to amount of K or Na atom To bituminous coal of average grain size of below $600\mu$, there is added potassium carbonate, sodium sulfate or sodium carbonate in the amount shown in Table 1. Then each of the mixtures is subjected to carbonization at 550° to 600° C. for 4 to 5 hours. Thus-obtained intimate mixture of bituminous coke and the potassium compound or sodium compound is subjected to gasification using steam-containing gas at about 850° to 900° C. up to a gasification yield of about 30 weight percent to produce carbon. Thus-produced carbon is packed in a column (1.5 m. in length and 1.0 m. in diameter). Flue gas containing 0.2 volume percent of sulfur dioxide is passed through the column, which is previously heated to 100° C., at a speed (linear velocity) of 0.3 m./second until sulfur dioxide is no longer taken up by the carbon.

Then steam is passed through the column at 350° C. to 450° C. whereby sulfuric acid in the carbon is taken off as sulfur dioxide. Sulfur dioxide thus taken off is determined and the $SO_2$-removing capacity of the carbon is calculated. The result is shown in the Table 1.

TABLE 1

| Experiment No. | Compound | Amount of K or Na atom | | $SO_2$-removing capacity ($SO_2$ g./100 g. of carbon*) |
|---|---|---|---|---|
| | | Mg. equivalent of atom relative to 100 g. bituminous coal | Mg. equivalent of atom relative to 100 g. bituminous coke | |
| 1 | K$_2$CO$_3$ | 0.6 | 1 | 8.8 |
| 2 | | 6 | 10 | 15.0 |
| 3 | | 12 | 20 | 20. |
| 4 | | 39 | 65 | 22.4 |
| 5 | | 48.6 | 81 | 27.7 |
| 6 | | 72.6 | 121 | 20.4 |
| 7 | | 79.2 | 132 | 14.0 |
| 8 | | 105.6 | 176 | 5.2 |
| 9 | Na$_2$SO$_4$ | 1.8 | 3 | 8.4 |
| 10 | | 6 | 10 | 10.6 |
| 11 | | 12 | 20 | 13.4 |
| 12 | | 39.5 | 65 | 15.2 |
| 13 | | 54.5 | 90 | 16.8 |
| 14 | | 80 | 131 | 8.1 |
| 15 | | 106.8 | 178 | 4.2 |
| 16 | Na$_2$CO$_3$ | 1.5 | 2.5 | 8.5 |
| 17 | | 6.0 | 10.0 | 12.6 |
| 18 | | 12.0 | 20.0 | 17.2 |
| 19 | | 33.5 | 55.0 | 11.6 |
| 20 | | 42.5 | 70.0 | 22.8 |
| 21 | | 53.0 | 85.0 | 24.3 |
| 22 | | 61.0 | 105.0 | 20.0 |
| 23 | | 90.5 | 150.0 | 5.0 |

* 100 g. of the carbon corresponds to a volume of about 217 cc.

From the above results, it is understood that desirable amount of the potassium compound or sodium compound to be employed is about 10 to about 120 mg. equivalent of Na or K atom relative to 100 g. of bituminous coke (or about 5 to about 75 mg. equivalent of Na or K atom relative to 100 g. of bituminous coal) in view of the $SO_2$-removing capacity of carbon produced.

TEST 2

Change of $SO_2$-removing capacity vis-a-vis gasification yield of the coke

To 100 parts by weight of bituminous coal of average grain size of below $600\mu$, there is added 3.35 parts by weight of potassium carbonate. Then the mixture is carbonized by heating up to about 600° C. for 5 hours. Thus-prepared coke is divided into five groups and each of the groups is subjected to gasification using steam-containing gas at about 850 to 900° C. until the gasification yield amounts to those shown in Table 2, respectively.

$SO_2$-removing capacity of thus-produced carbon is tested in the same manner as in Test 1.

The result is shown in the Table 2.

TABLE 2

| Gasification yield (wt. percent) | $SO_2$-removing capacity ($SO_2$ g./100 cc. carbon) |
|---|---|
| 10 | 8.1 |
| 20 | 12.1 |
| 30 | 12.75 |
| 40 | 11.25 |
| 50 | 8.8 |

From the above result, it is understood that the carbon, which is produced by gasification until the gasification yield amounts to about 20 to about 40 weight percent has relatively high $SO_2$-removing capacity.

EXAMPLE 1

Bituminous coal consisting of fixed carbon 46.9 wt. percent, volatile substance 46.5 wt. percent and ash 4.3 wt. percent is powdered to an average grain size of below about $600\mu$. To 100 parts of the powdered bituminous coal, there is added 3.35 parts of potassium carbonate. The mixture is carbonized by heating up to about 600° C. for 4 to 5 hours. Thus-prepared coke is after-crushed to about 14 to about 20 mesh (Tyler), subjected to gasification using steam-containing flue gas at about 900° C. up to a gasification yield of about 30 weight percent. Thus-produced carbon is packed in a column (1.5 m. in length and 1.0 m. in diameter). Flue gas having components shown in Table 3 is passed through the column, which is previously heated at 100° C., at a speed (linear velocity) of 0.4 m./second.

The flue gas after contact with the carbon has the components shown in the Table 3.

TABLE 3.—COMPONENTS OF FLUE GAS

| Component: | Before contact (vol. percent) | After contact (vol. percent) |
|---|---|---|
| $SO_2$ | 0.2 | (¹) |
| $N_2$ | 76.2 | 76.6 |
| $O_2$ | 3.4 | 3.3 |
| $CO_2$ | 14.2 | 14.3 |
| $H_2O$ | 6.0 | 5.8 |
| $SO_3$ | Trace | (¹) |

¹ Not detected.

As clearly shown in Table 3, sulfur dioxide and sulfur trioxide contained in the flue gas are completely removed by the treatment with the carbon.

Even after the above procedure is continuously conduced for about 26 hours, there is detected no sulfur dioxide nor sulfur trioxide in the flue gas passing through the column.

After about 26 hours, the column is heated at 350° to 450° C. and steam is passed through the thus-heated column for 4 to 6 hours, whereby sulfuric acid caught by the carbon is taken off as sulfur dioxide, which amounts to about 125 kg.

EXAMPLE 2

The same procedure as in Example 1 is conducted except using 3.68 parts of sodium sulfate, 2.70 parts of sodium carbonate, 2.3 parts of sodium hydroxide, 4.25 parts of potassium sulfate or 2.7 parts of potassium hydroxide in place of the potassium carbonate.

Even after 16, 23, 23, 17 and 25 hours continuous proceeding, respectively, there is detected no sulfur dioxide in the gas passing through the column.

When use is made of carbon produced by the same procedure as in Example 1 except using no potassium carbonate, there is detected sulfur dioxide in the gas passing through the column after about 8.5 hours continuous proceeding.

What is claimed is:

1. A method for removing sulfur dioxide from gas containing the same, which comprises contacting the gas with carbon produced by (a) carbonizing a mixture of bituminous coal and an inorganic potassium compound or sodium compound in an amount of about 5 to about 75 mg. equivalent of K or Na atom relative to 100 g. of the bituminous coal, and (b) subjecting thus-produced carbonized product to gasification until the gasification yield reaches about 20 to about 40 weight percent.

2. The method as claimed in claim 1, wherein the inorganic potassium compound is potassium carbonate.

3. The method as claimed in claim 1, wherein the inorganic potassium compound is potassium sulfate.

4. The method as claimed in claim 1, wherein the inorganic sodium compound is sodium carbonate.

5. The method as claimed in claim 1, wherein the inorganic sodium compound is sodium sulfate.

6. The method as claimed in claim 1 wherein the gasification is carried out with steam or steam-containing flue gas.

7. In a process for the removal of $SO_2$ from sulfur dioxide-containing gas by passing the same through activated carbon, the improvement according to which the gas is passed through a mixture of carbon and inorganic metallic compound, said mixture having been gasified to an extent of about 20 to at most about 40 weight percent.

8. The improvement according to claim 7, the inorganic metallic compound being an inorganic sodium compound or an inorganic potassium compound.

9. The improvement according to claim 8, wherein the inorganic metallic compound is sodium carbonate, sodium sulfate, potassium carbonate, potassium sulfate or a mixture of two or more thereof.

References Cited

FOREIGN PATENTS

| | | | |
|---|---|---|---|
| 135,639 | 11/1949 | Australia | 23—2 |
| 1,090,306 | 11/1967 | Great Britain | 23—178 |

EARL C. THOMAS, Primary Examiner

U.S. Cl. X.R.

23—178; 252—447